May 20, 1930.                J. ROBINSON                1,759,372
                     AUTOMATIC TRAIN PIPE CONNECTER
                       Original Filed Jan. 26, 1921
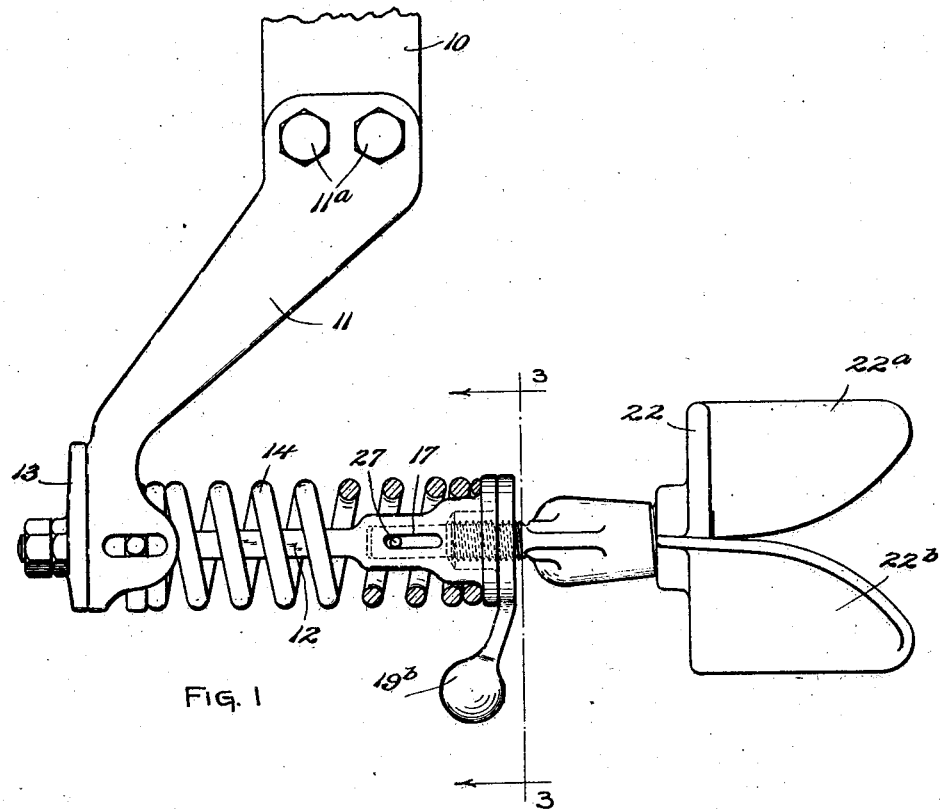
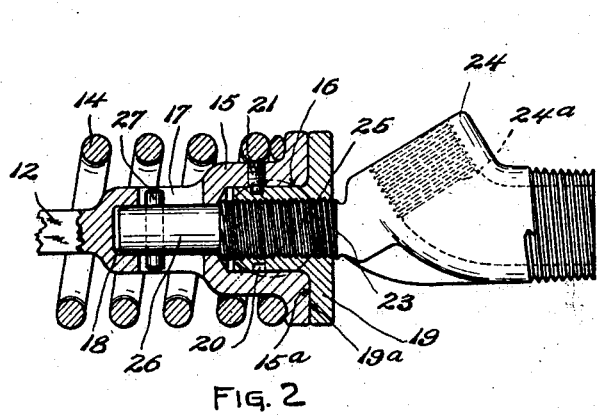
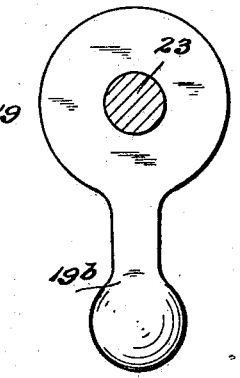
INVENTOR
BY Joseph Robinson
Watson, Coit, Morse and Grindle
ATTORNEY Patented May 20, 1930

1,759,372

UNITED STATES PATENT OFFICE

JOSEPH ROBINSON, OF NEW YORK, N. Y.

AUTOMATIC TRAIN-PIPE CONNECTER

Application filed January 26, 1921, Serial No. 440,099. Renewed October 2, 1928.

This invention relates to automatic train pipe connecters and particularly to an arrangement for varying the distance between the coupling head and the bracket.

In devices of this kind it is sometimes necessary to change the distance between the face of the coupling head and the bracket, to compensate for the wear on the knuckles of the car coupler, and it is the object of the invention to provide a simple and efficient arrangement by which the position of the head relative to the bracket may be varied.

In the drawings accompanying this specification and forming a part thereof:

Fig. 1 is a side elevation of my improved device;

Fig. 2 is a vertical longitudinal sectional view through a part of the device; and Fig. 3 is a transverse sectional view on the line 3—3 of Figure 1.

Referring to the drawings in detail 10 represents a lug on the car coupler or any other suitable part of the car to which the connecter is applied. The bracket 11 of the connecter is secured to the lug 10 as by means of bolts $11^a$, and the lower end of the bracket 11 is provided with any suitable means for supporting the coupling head. Preferably such means include a stem 12 suitably mounted in the bracket so as to be movable in all directions, this stem being provided on its rear portion with a flange member 13 which is adapted to contact with the rear face of the bracket. A spring 14 surrounds the stem 12 and serves to hold the same in substantially horizontal position in front of the bracket.

At its front end the stem 12 is provided with an enlarged portion 15 in which a socket 16 is formed the bottom of which communicates with a slot 17 also forced in the enlarged portion of the stem. A second socket 18 is provided rearwardly of said slot 17. An internally threaded nut 19 is rotatively mounted in the socket 16, this nut being provided with a circumferential groove 20 which is engaged by a set screw 21 mounted in the body portion of the head 15, this set screw serving to prevent removal of the nut from the socket. The nut 19 is also provided with an outwardly projecting portion or shoulder $19^a$ which is adapted to engage a lateral projecting portion $15^a$ of the head 15, these parts $15^a$ and $19^a$ serving to limit the extent to which the nut may be forced into the socket 16. The nut 19 is further provided with a weighted handle $19^b$ by which it may be rotated.

The coupling head 22 may be of any approved construction but is preferably of the well known type having guiding wings $22^a$, $22^b$. A shank 23 is secured to the head in any desired manner preferably being connected to the nipple or conduit 24 which is in turn threadedly connected to the head and which is provided with a threaded socket $24^a$ to receive the end of a train pipe hose.

The shank 23 of the head is provided with a threaded portion 25 which is adapted to engage the internal threads of the nut 19 heretofore referred to, and this shank is also provided with a smooth portion 26 which is adapted to enter the socket 18 above mentioned. A pin 27 is mounted in the smooth portion of the shank 23 which pin is arranged to engage in the slot 17 heretofore mentioned in the stem 12.

The parts may be assembled by inserting the nut 19 into the socket of the head and securing the same in place by means of the set screw 21. The shank 23 may then be threaded into the nut 19 the desired distance with the forward end thereof engaging the socket 18, and the pin 27 may then be inserted into the shaft 23 through the slot 17 of the head. With the parts so assembled it will be apparent that the pin 27 will prevent relative rotation between the stem 12 and shank 23 and that rotation of the nut 19 through the medium of the handle $19^b$ will cause movement of the shank 23 longitudinally relative to the stem 12, or in other words, such operation will change the position of the coupling head 22 relative to the bracket 11. The stem 12 and shank 23 together thus constitute a member which serves to support the head in front of the bracket, this member consisting of the two parts which can be adjusted relative to each other to vary its length.

It is apparent that the foregoing construction provides a simple and efficient arrangement by which the position of the head may be adjusted and one in which such adjustment may be accomplished at any time desired, that is, when the coupling head is connected to or free from a mating head. It is also apparent that various changes or modifications in the details of this construction may be made without departing from the scope of this invention.

Having thus described the invention what is claimed as new and desired to be secured by Letters Patent is:

1. In an automatic train pipe connecter, a bracket, a stem supported on said bracket for universal movement relative thereto, a flange carried by said stem and adapted to contact with the rear face of the bracket, a coupling head, a threaded shank projecting rearwardly therefrom, said stem having a threaded portion engaged by said shank whereby said head may be adjusted toward and from said bracket, means for permanently preventing rotation of said head relative to said stem, and means for yieldingly supporting said stem and head in front of the bracket.

2. In an automatic train pipe connecter, a coupling head, a stem pivotally supported on said bracket, a shank secured to said head, a threaded nut rotatably mounted on one of said last named parts and the other part having a threaded portion engaging the threads of said nut, whereby rotation of said nut will cause relative movement between said shank and stem.

3. In an automatic train pipe connecter, a bracket, a coupling head, a stem pivotally supported on said bracket, a shank secured to said head, one of said last named parts having a socket, a nut rotatably mounted in said socket and having threads, the other part having a threaded portion engaging the threads of said nut, and means for rotating said nut.

4. In an automatic train pipe connecter, a bracket, a coupling head, a stem pivotally supported on said bracket, a shank secured to said head, said stem having a socket, a nut rotatably mounted in said socket, said stem and nut having cooperating contact surfaces, and said shank having a threaded portion engaging said nut, whereby rotation of said nut causes relative movement between said stem and shank.

5. In an automatic train pipe connecter, a bracket, a coupling head, a stem pivotally supported on said bracket, a shank secured to said head, one of said last named parts having a socket, a nut rotatably mounted in said socket and having threads, the other part having a threaded portion engaging the threads of said nut, means for rotating said nut, and means for preventing relative rotation between said shank and stem.

6. In an automatic train pipe connecter, a bracket, a coupling head, a stem supported by the bracket, a shank secured to the head, said stem having a socket and also having a slot adjacent the rear of said socket, an internally threaded nut rotatably secured in said socket, said shank having a threaded portion engaging the threads of said nut and a pin secured to said shank and engaging said slot of the stem whereby relative rotation of said stem and shank is prevented.

7. In an automatic train pipe connecter, a coupling head, a bracket, a stem non-rotatably supported on said bracket, a shank secured to said head and to said stem, and means for adjusting one of said parts relative to the other, said means comprising a nut on one part and a threaded portion on the other part engaging said nut, and a handle secured to the nut for rotating the same.

8. In an automatic train pipe connecter, a bracket, a coupling head, a stem pivotally supported on the bracket, a shank secured to the head, one of said parts, said stem or shank, having a socket at its front end and also having a slot at the rear of said socket and a second socket at the rear of said slot, a nut rotatably mounted in said first named socket, the other of said parts, said stem and shank, having a threaded portion engaging said nut and also having a portion fitting said second socket, and a pin secured to said last named part and engaging the slot in the first named part.

9. In an automatic train pipe connecter, a bracket, a head supporting member pivotally associated with said bracket and including three parts, one of said parts having a socket which is adapted to receive a threaded portion on the end of one of the other parts, the third part being rotatably and non-removably mounted in said socket and having threads thereon engaging the threaded portion of said second part.

10. In an automatic train pipe connecter, a bracket, a head supporting member pivotally associated with said bracket and comprising three parts, one of said parts having a socket and another of said parts having a threaded portion extending into said socket and means for holding said two parts against relative rotation, the third part comprising a nut rotatably and non-removably arranged in said second part.

In testimony whereof I affix my signature.

JOSEPH ROBINSON.